US012783316B2

(12) United States Patent
Yarabolu

(10) Patent No.: US 12,783,316 B2
(45) Date of Patent: Nov. 3, 2026

(54) SYSTEMS AND METHODS FOR DETERMINING ELECTRONIC ACTIVITY USING ADVANCED COMPUTATIONAL MODELS FOR DATA ANALYSIS AND AUTOMATED PROCESSING

(71) Applicant: BANK OF AMERICA CORPORATION, Charlotte, NC (US)

(72) Inventor: Vijay Kumar Yarabolu, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 348 days.

(21) Appl. No.: 18/654,156

(22) Filed: May 3, 2024

(65) Prior Publication Data

US 2025/0342061 A1 Nov. 6, 2025

(51) Int. Cl.
*G06F 3/00* (2006.01)
*G06F 9/50* (2006.01)

(52) U.S. Cl.
CPC ............ *G06F 9/5038* (2013.01); *G06F 9/505* (2013.01)

(58) Field of Classification Search
CPC .......................................................... G06F 9/50
See application file for complete search history.

(56) References Cited

U.S. PATENT DOCUMENTS 8,494,985 B1 * 7/2013 Keralapura ............. H04L 63/12 706/12
10,511,637 B2 12/2019 DiCorpo
10,587,577 B2 3/2020 Adler
10,693,745 B2 6/2020 Polinati
10,812,462 B2 10/2020 Xu
(Continued)

FOREIGN PATENT DOCUMENTS

AU 2019204764 B2 3/2021
AU 2021200444 B2 1/2022
(Continued)

OTHER PUBLICATIONS

Nanwang, Security-Aware Task Scheduling Using Untrusted Components in High-Level Synthesis, (Year: 2017).*

*Primary Examiner* — Lechi Truong
(74) *Attorney, Agent, or Firm* — Moore & Van Allen PLLC; William Walters

(57) ABSTRACT

Systems, computer program products, and methods are described herein for determining electronic activity using advanced computational models for data analysis and automated processing. The present disclosure is configured to generate a criticality assessment of a task based on one or more weights determined by an impact analysis; allocate a grant token to the task, wherein the grant token comprises an allotment of processing time of the system to complete the task; monitor execution of the task, wherein monitoring the execution comprises comparing an execution timeframe, wherein the execution timeframe comprises an amount of processing time to execute the task, and an execution timeframe factor, wherein the execution timeframe factor is a multiple of the processing time allocated by the grant token; and terminate a malicious task, wherein terminating the malicious task comprises flagging the malicious task and terminating completion of the malicious task.

14 Claims, 6 Drawing Sheets

(56) References Cited

U.S. PATENT DOCUMENTS 11,108,635 B2 8/2021 Tero
11,108,647 B2 8/2021 Garty
11,216,261 B1 * 1/2022 Moyal .................... G06F 9/455
11,240,271 B2 2/2022 Wiener
11,423,155 B2 8/2022 Zettel
11,429,727 B2 8/2022 Mohan
11,449,579 B2 9/2022 Flores
11,456,927 B2 9/2022 Rutten
11,533,339 B2 12/2022 Brotherton
11,652,790 B2 5/2023 Chan
11,777,980 B2 10/2023 Henderson
11,818,161 B2 11/2023 Vester
11,922,155 B2 3/2024 Barron-Kraus
2005/0198636 A1 * 9/2005 Barsness ............ G06F 11/3452 718/100
2006/0200550 A1 * 9/2006 Nelson ................ H04L 65/4038 709/224
2009/0082943 A1 * 3/2009 Sugiyama ............... F02D 41/26 701/103
2010/0017738 A1 * 1/2010 Rhodes .................. G06Q 10/06 715/772
2012/0060166 A1 * 3/2012 Jardine ................ G06Q 10/109 718/104
2016/0092108 A1 * 3/2016 Karaje .................... G06F 3/067 718/103
2016/0261505 A1 * 9/2016 Saniee .................... H04L 67/10
2021/0360058 A1 * 11/2021 Tai ...................... H04L 67/1008

FOREIGN PATENT DOCUMENTS

EP 3641221 B1 8/2021
JP 6661809 B2 3/2020

* cited by examiner

SYSTEMS AND METHODS FOR DETERMINING ELECTRONIC ACTIVITY USING ADVANCED COMPUTATIONAL MODELS FOR DATA ANALYSIS AND AUTOMATED PROCESSING

TECHNOLOGICAL FIELD

Example embodiments of the present disclosure relate to systems and methods for determining electronic activity using advanced computational models for data analysis and automated processing.

BACKGROUND

There are significant challenges associated with determining malicious electronic activity. Applicant has identified a number of deficiencies and problems associated with detecting malicious electronic activity. Through applied effort, ingenuity, and innovation, many of these identified problems have been solved by developing solutions that are included in embodiments of the present disclosure, many examples of which are described in detail herein.

BRIEF SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Systems, methods, and computer program products are provided for determining electronic activity using advanced computational models for data analysis and automated processing.

Embodiments of the present invention address the above needs and/or achieve other advantages by providing apparatuses (e.g., a system, computer program product, and/or other devices) and methods for determining electronic activity using advanced computational models for data analysis and automated processing. The system embodiments may comprise a processing device and a non-transitory storage device containing instructions when executed by the processing device, to perform the steps disclosed herein. In computer program product embodiments of the invention, the computer program product comprises a non-transitory computer-readable medium comprising code causing an apparatus to perform the steps disclosed herein. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the steps disclosed herein.

In some embodiments, the present invention generates a criticality assessment of a task based on one or more weights determined by an impact analysis, wherein the impact analysis determines how the task affects an entity's operations. In some embodiments, the present invention allocates a grant token to the task, wherein the grant token includes an allotment of processing time of the system to complete the task. In some embodiments, the present invention monitors execution of the task, wherein monitoring the execution includes comparing an execution timeframe, wherein the execution timeframe includes an amount of processing time to execute the task, and an execution timeframe factor, wherein the execution timeframe factor is a multiple of the processing time allocated by the grant token. In some embodiments, the present invention terminates a malicious task, wherein terminating the malicious task includes flagging the malicious task and terminating completion of the malicious task.

In some embodiments, determining how the task affects an entity's operations includes pooling the task in a task pool, wherein the task is received from a client device. In some embodiments, determining how the task affects an entity's operations includes bucketing the task based on a critical factor, wherein the critical factor includes an integral operation associated with the entity. In some embodiments, determining how the task affects an entity's operations includes segmenting the task based on a secondary factor, wherein the secondary factor includes a supplementary description of the integral operation associated with the entity.

In some embodiments, allocating the grant token further includes ensuring the criticality assessment is equal to or greater than a criticality assessment threshold.

In some embodiments, the present invention may use a smart load balancer to prioritize the execution of the task by analyzing the criticality assessment of the task.

In some embodiments, the smart load balancer further includes selecting a server to handle the execution of the task. In some embodiments, the smart load balancer further includes allocating resources for the execution of the task.

In some embodiments, monitoring the execution of the task further includes comparing the execution timeframe and the execution timeframe factor to determine a flag type, wherein the flag type includes a green flag, wherein the green flag indicates the task is complete and the grant token is not exhausted. In some embodiments, the flag type further includes a yellow flag, wherein the yellow flag indicates the task is not complete, the grant token is exhausted, and the execution timeframe is less than the execution timeframe factor. In some embodiments, the flag type further includes a red flag, wherein the red flag indicates the task is not complete, the grant token is exhausted, and the execution timeframe is equal to or greater than the execution timeframe factor.

In some embodiments, the yellow flag further includes generating an additional grant token for the execution of the task.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompany-ing drawings. The components illustrated in the figures may or may not be present in certain embodiments described herein. Some embodiments may include fewer (or more) components than those shown in the figures.

Figure 1A:
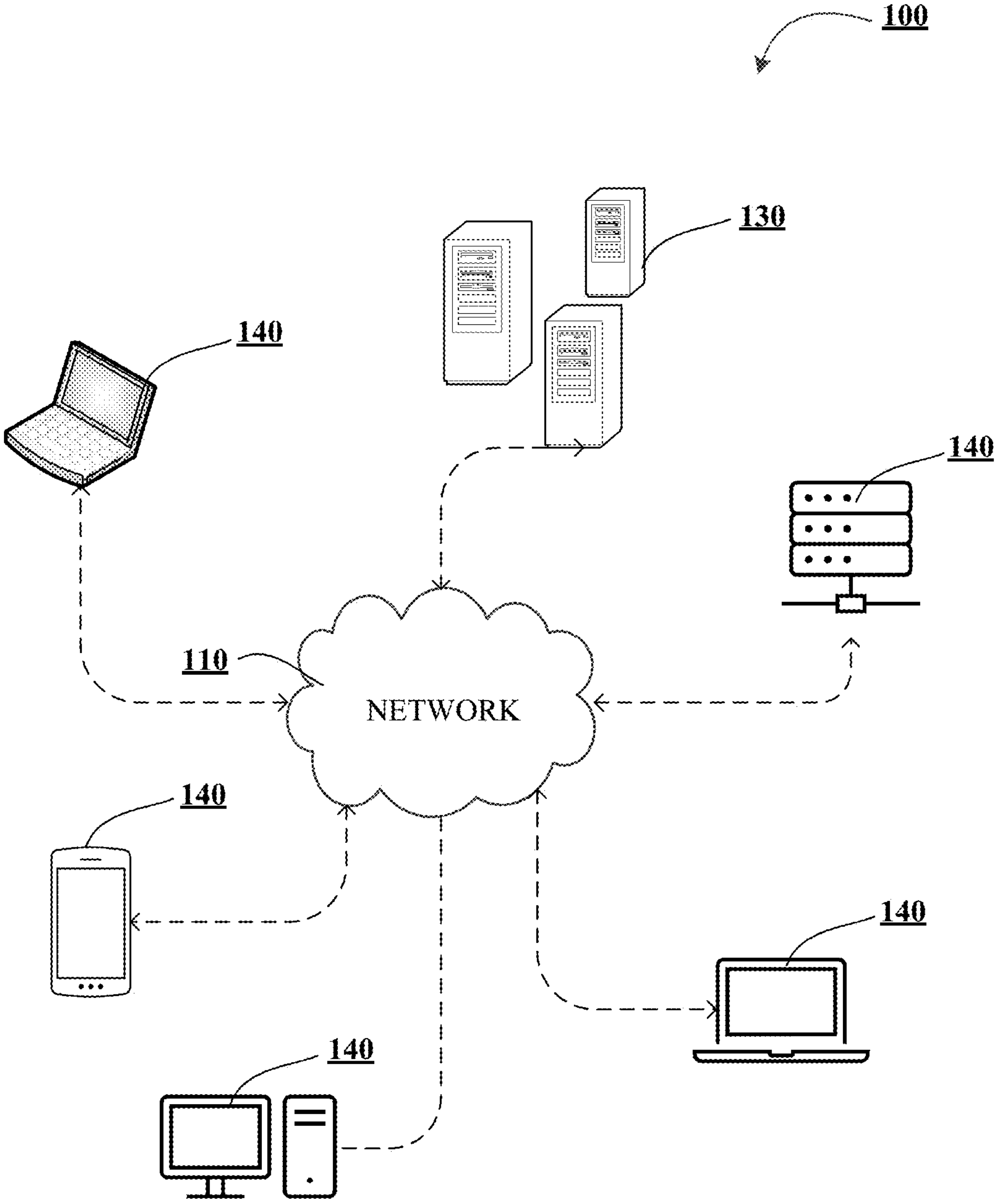
Figure 1B:
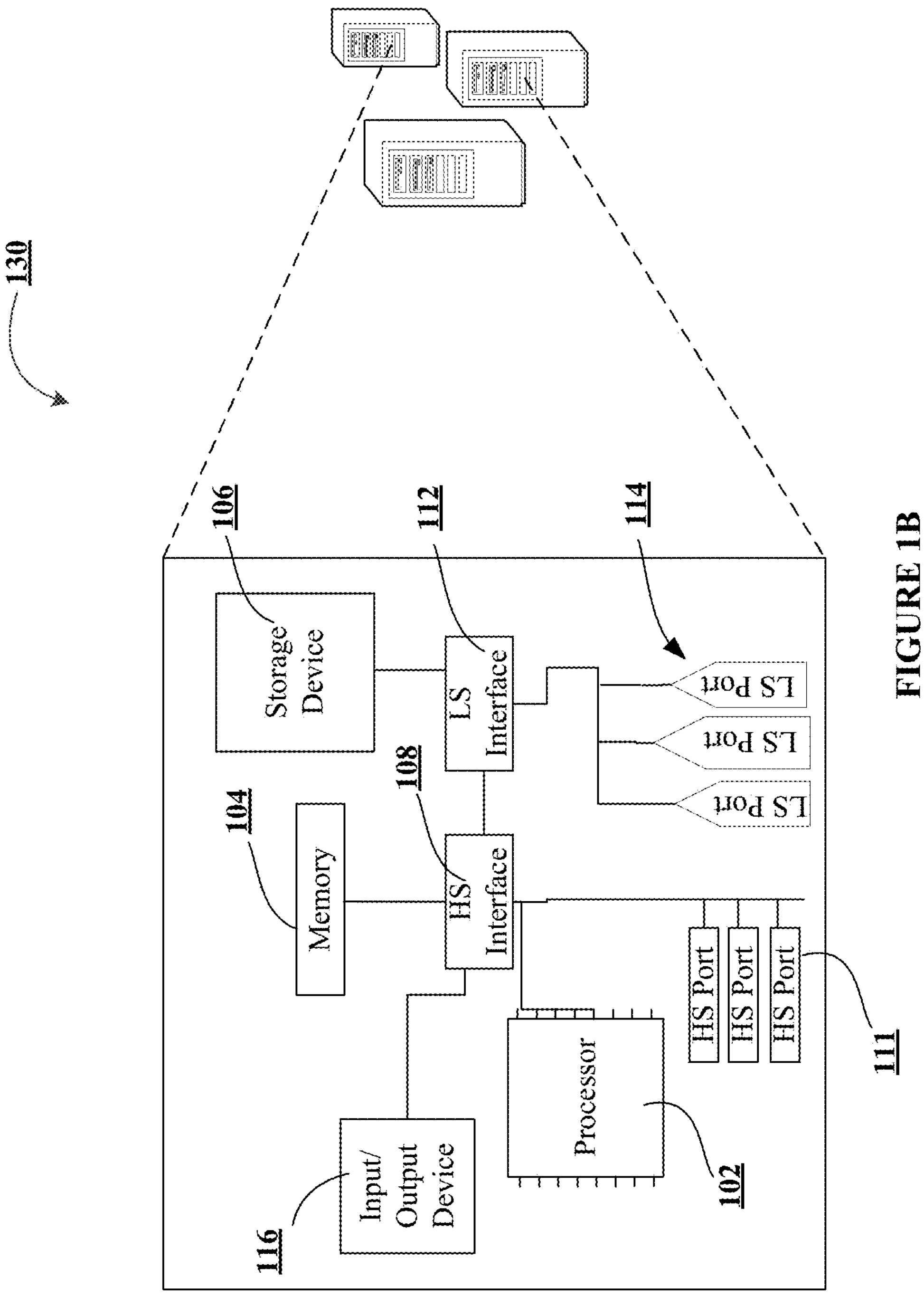
Figure 1C:
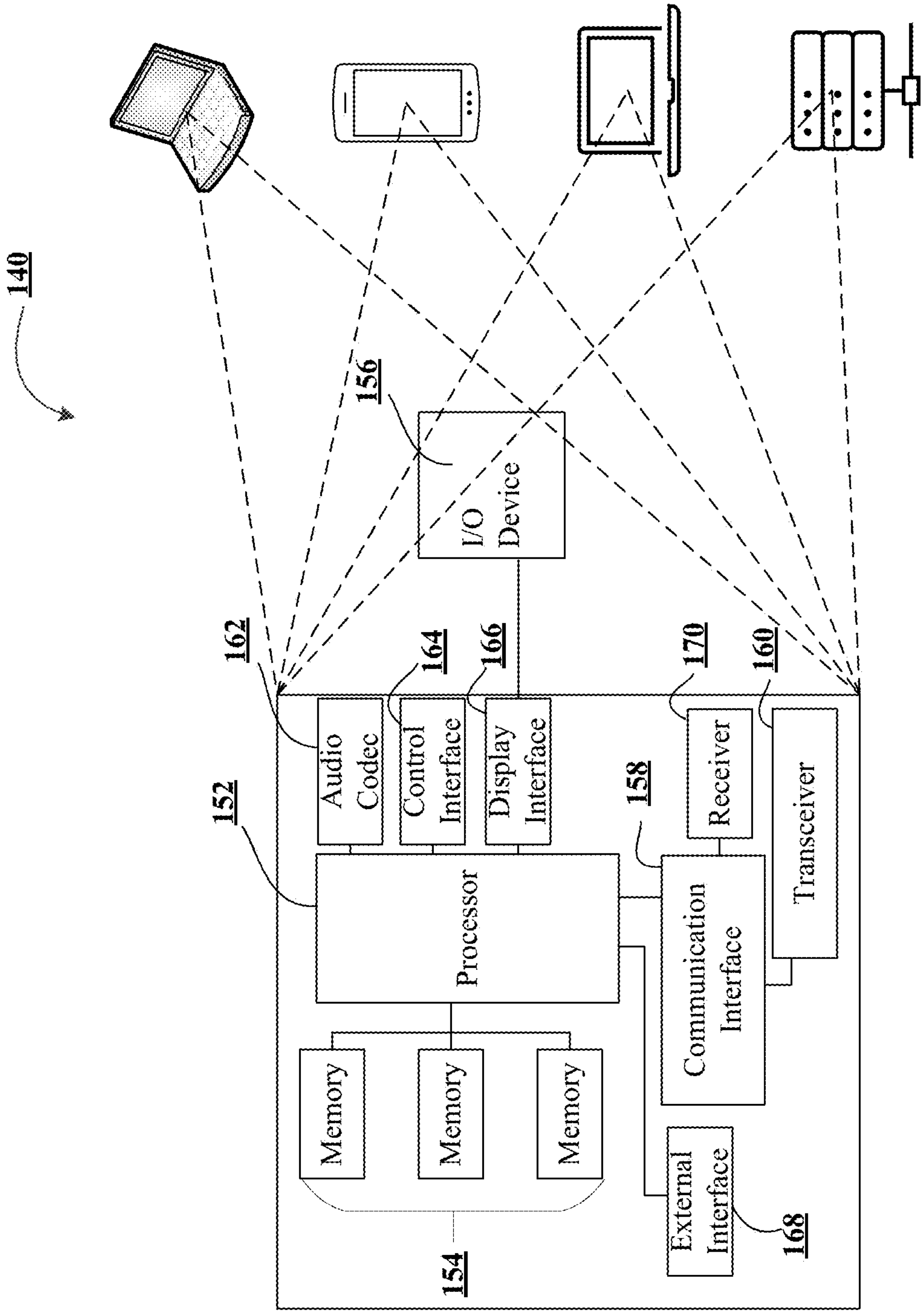
Figure 2:
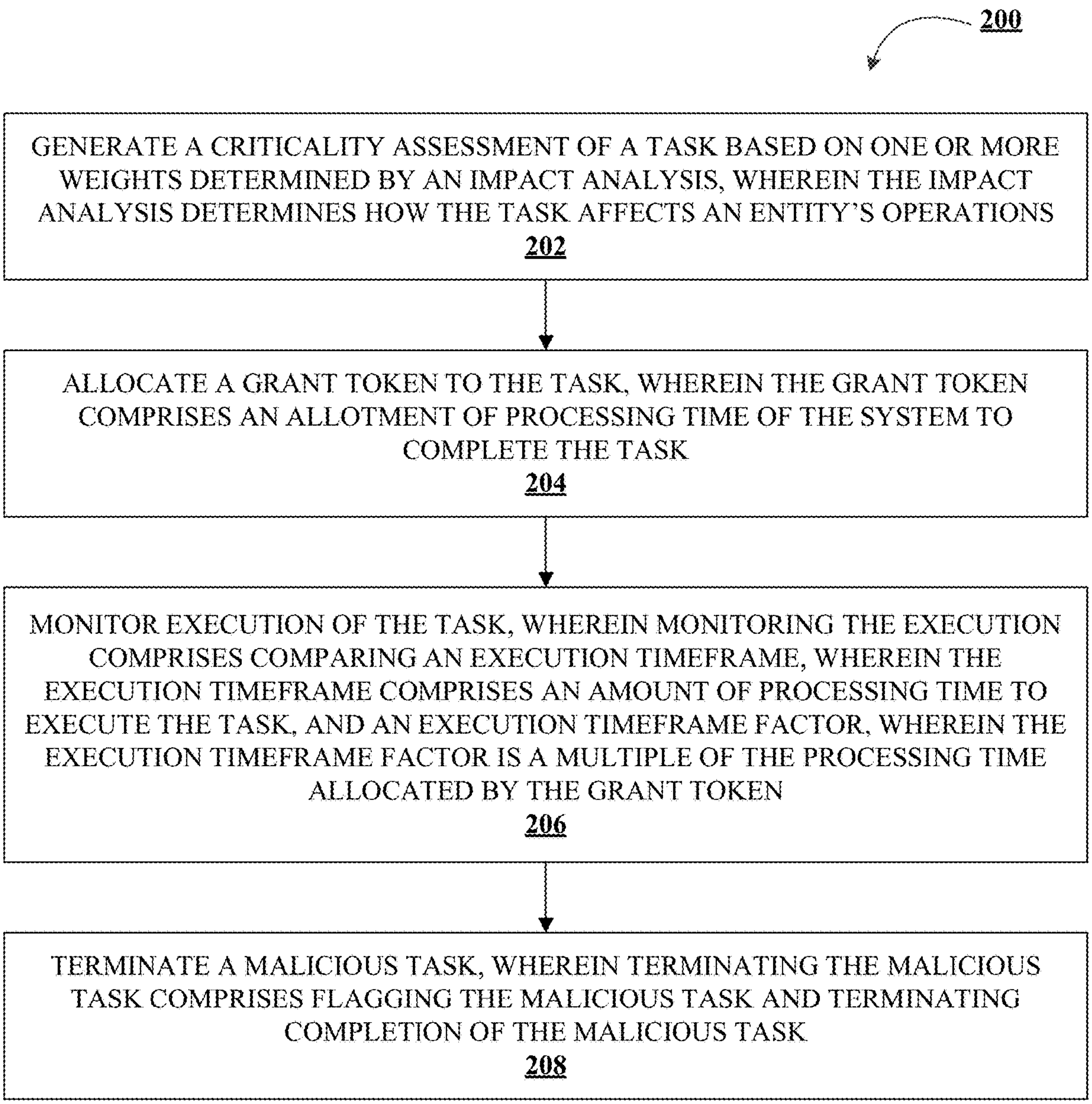
Figure 3:
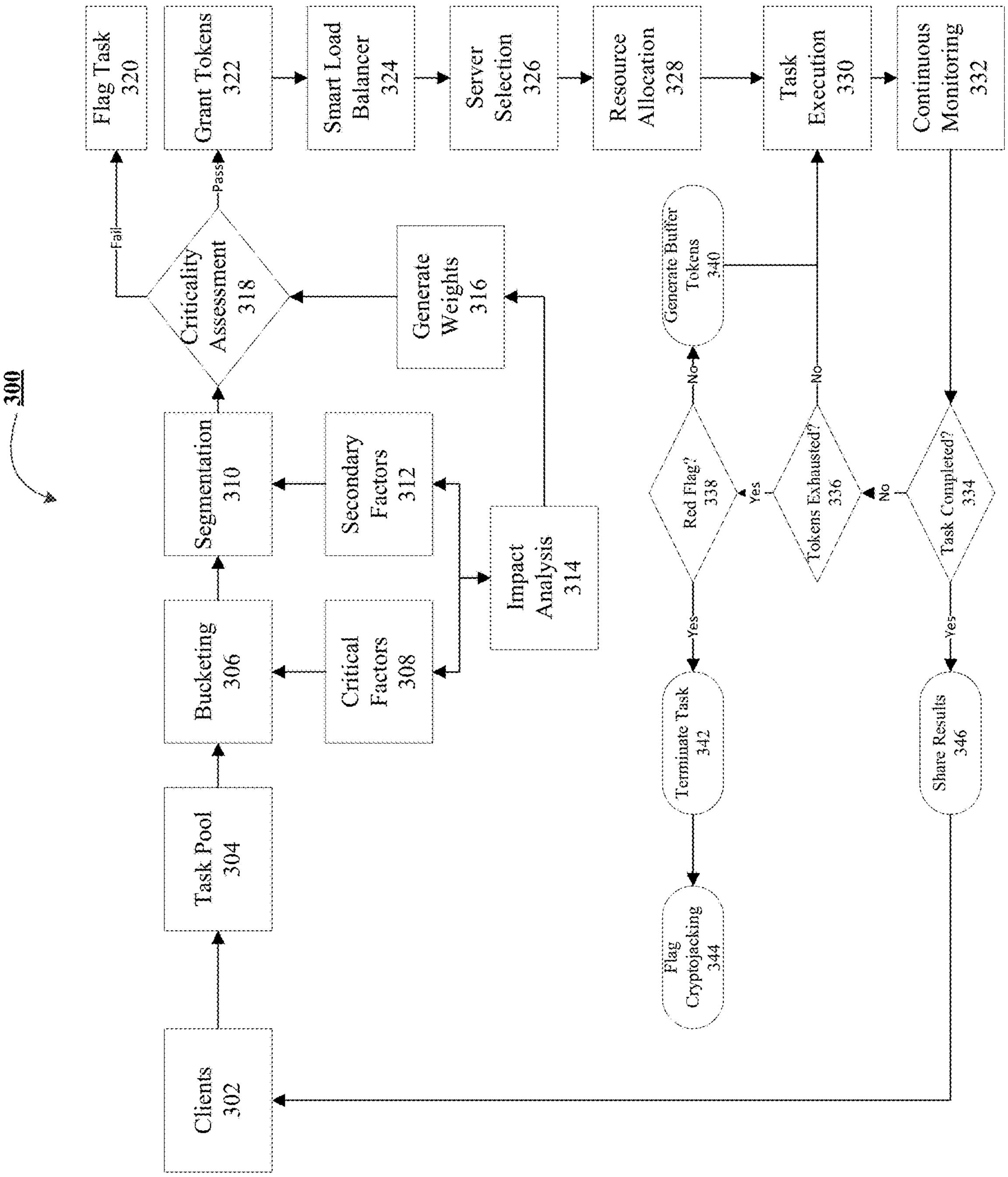
Figure 4:
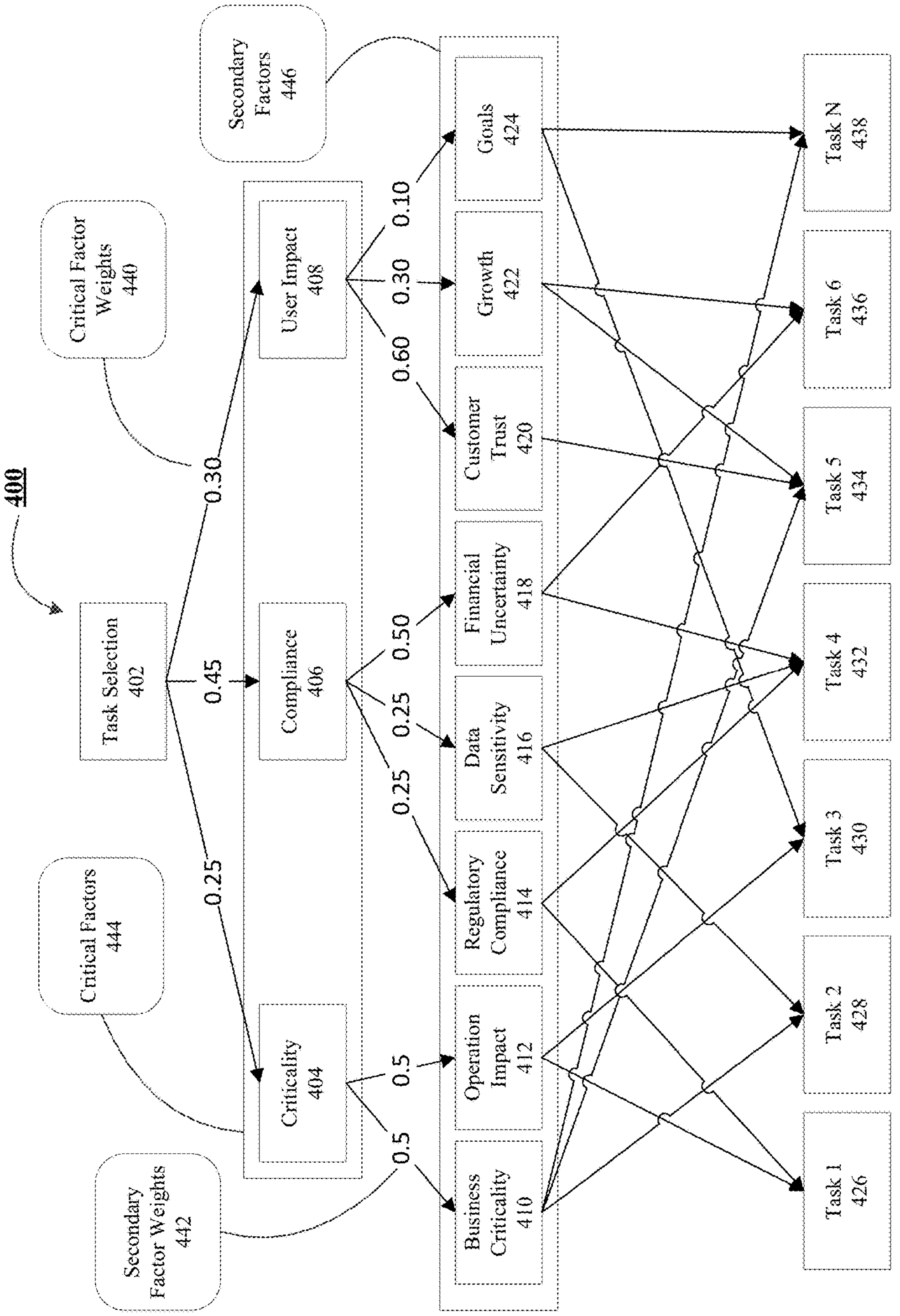

FIGS. 1A-1C illustrates technical components of an exemplary distributed computing environment for determining electronic activity using advanced computational models for data analysis and automated processing, in accordance with an embodiment of the disclosure;

FIG. 2 illustrates a process flow for determining electronic activity using advanced computational models for data analysis and automated processing, in accordance with an embodiment of the disclosure;

FIG. 3 illustrates a schematic of an example embodiment of the system, in accordance with an embodiment of the disclosure; and FIG. 4 illustrates a schematic of an example embodiment of the impact analysis, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Cryptomining is the process of solving complex computational tasks (e.g., cryptographic puzzles) to create new blocks on the ledger. An individual (e.g., miner) who successfully creates a new block is rewarded with cryptocurrency as a payment for spending the resources for mining. Participating in this resource-intensive activity requires specialized hardware, cooling systems, and significant electricity that makes the mining an expensive affair. Malicious individuals will gain unauthorized access to third party servers, especially the financial industry's servers, which are usually equipped with high performance and storage specifications. This unauthorized usage of third party's hardware is called cryptojacking. In recent years, cryptojacking has increased exponentially and poses major security challenges for organizations.

Cryptojacking is a unique style of malware in that a cryptojacker is not intending to damage the host's computing equipment. Rather, the malware used is running undetected in the background of the host's computing equipment. Typically, the only indication that such cryptojacking malware is present on the host's computer is a decrease in performance of the host's device. Other indications of cryptojacking malware may include unusual traffic patterns in networking equipment, overheating of computing components, device shutdowns due to lack of processing power, unexpected increases in the cost of resources, or the like.

What is more, the present disclosure provides a technical solution to a technical problem. As described herein, the technical problem includes unauthorized third parties gaining access to another's computing resources to mine cryptocurrency, significantly affecting the accessed systems leading to increased resource usage and degradation in the system's performance. The technical solution presented herein allows for detecting and mitigating unauthorized third parties from accessing a system in order to limit degradation, resource usage, and harm caused by cryptojacking. In particular, the electronic activity determination system is an improvement over existing solutions to for determining malicious activity on a computing system (e.g., cryptojacking), (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

In addition, the technical solution described herein is an improvement to computer technology and is directed to non-abstract improvements to the functionality of a computer platform itself. Specifically, an electronic activity determination system (e.g., system 130) as described herein is a solution to the problem of unauthorized individuals accessing another person's computing resources to mine cryptocurrency, resulting in decreased system performance and increased costs due to overconsumption of resources. Further, the electronic activity determination system may be characterized as identifying a specific improvement in computer capabilities and/or network functionalities in response to the electronic activity determination system's integration to existing devices, software, applications, and/or the like. In this way, the electronic activity determination system improves the capability of a system to mitigate unauthorized access to a networking environment through the use of advanced computational models for data analysis and automated processing. Further, the electronic activity determination system improves the functionality of networks in response to reducing the resources consumed by the system (e.g., network resources, computing resources, memory resources, and/or the like).

FIGS. 1A-1C illustrate technical components of an exemplary distributed computing environment 100 for determining electronic activity using advanced computational models for data analysis and automated processing, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server (e.g., system 130). In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, resource distribution devices, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology. The network 110 may include one or more wired and/or wireless networks. For example, the network 110 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion, or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, storage device 106, a high-speed interface 108 connecting to memory 104, high-speed expansion points 111, and a low-speed interface 112 connecting to a low-speed bus 114, and an input/output (I/O) device 116. The system 130 may also include a high-speed interface 108 connecting to the memory 104, and a low-speed interface 112 connecting to low-speed port 114 and storage device 106. Each of the components 102, 104, 106, 108, 111, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130, may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 may store information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router (e.g., through a network adapter).

The system 130 may be implemented in a number of different forms. For example, the system 130 may be implemented as a standard server, or multiple times in a group of such servers. Additionally, the system 130 may also be implemented as part of a rack server system or a personal computer (e.g., laptop computer, desktop computer, tablet computer, mobile telephone, and/or the like). Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 156, 158, 160, 162, 164, 166, 168 and 170, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor 152 may be implemented as a chipset of chips that include separate and multiple analog and digital processors. The processor 152 may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156 (e.g., input/output device 156). The display 156 may be, for example, a Thin-Film-Transistor Liquid Crystal Display (TFT LCD) or an Organic Light Emitting Diode (OLED) display, or other appropriate display technology. An interface of the display may include appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a Single In Line Memory Module (SIMM) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, near-field communication (NFC), and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed application specific integrated circuits (ASICs), computer hardware, firmware, software, and/or combinations thereof.

FIG. 2 illustrates a process flow for determining electronic activity using advanced computational models for data analysis and automated processing, in accordance with an embodiment of the disclosure. The method may be carried out by various components of the distributed computing environment 100 discussed herein (e.g., the system 130, one or more end-point device(s) 140, etc.). An example system may include at least one processing device and at least one non-transitory storage device with computer-readable program code stored thereon and accessible by the at least one processing device, wherein the computer-readable code when executed is configured to carry out the method discussed herein.

In some embodiments, an electronic activity determination system (e.g., similar to one or more of the systems described herein with respect to FIGS. 1A-1C) may perform one or more of the steps of process flow 200. For example, an electronic activity determination system (e.g., the system 130 described herein with respect to FIGS. 1A-1C) may perform the steps of process flow 200.

As shown in block 202 of FIG. 2, the process flow 200 of this embodiment includes generating a criticality assessment of a task based on one or more weights determined by an impact analysis, wherein the impact analysis determines how the task affects an entity's operations.

In some embodiments, the criticality assessment of the task may include qualitative and quantitative elements. For instance, the qualitative elements may include operational importance of the task, safety and regulatory compliance impact the task may have, stakeholder impacts, the resilience of the system to handle the task, redundancy factors of the task, or the like. The quantitative elements may include failure rate data, cost impacts, uncertainty probabilities associated with the task, performance metrics, downtime analysis, or the like.

In some embodiments, the impact analysis (e.g., determining how the task affects an entity's operations) may include pooling the task in a task pool, wherein the task is received from a client device. For example, and as shown in FIG. 3, clients 302 may send requests to a task pool 304 to collect the incoming tasks received by the system.

In some embodiments, the impact analysis may include bucketing the task based on a critical factor, wherein the critical factor includes an integral operation associated with the entity. For example, and as shown in FIG. 3, the tasks may be sent to bucketing 306 after being collected in the task pool 304. Further, the impact analysis 314 and the critical factors 308 may influence the bucketing 306 process to organize the tasks into meaningful categories. The critical factors may include elements or conditions that are essential for the core operations of an entity. The critical factors may significantly influence the entity's ability to achieve its objectives and maintain operational effectiveness. For example, and as shown in FIG. 4, the critical factors 444 may include criticality 404, compliance 406, and user impact 408. In some embodiments, the critical factors may further include urgency and deadline sensitivity, resource efficiency, dependencies and relationships, data sensitivity and security, strategic objectives, uncertainty assessment, transaction authorization and controls, stakeholder trust, financial reporting and transparency, or the like. In this way, the critical factors may represent operational objectives the entity (or an entity's representative) deem fundamental to the entity's operations.

In some embodiments, the impact analysis may include segmenting the task based on a secondary factor, wherein the secondary factor includes a supplementary description of the integral operation associated with the entity. For example, and as shown in FIG. 3, the impact analysis 314 and the secondary factors 312 may influence the segmentation 310 of the tasks. The secondary factors may include elements or conditions that describe one or more portions of a critical factor. The secondary factors may breakdown the critical factors into more discreet elements to provide actionable steps towards determining whether executing a task is appropriate. For example, and as shown in FIG. 4, the secondary factors 446 may include business criticality 410, operation impact 412, regulatory compliance 414, data sensitivity 416, financial uncertainty 418, customer trust 420, growth 422, and goals 424. In some embodiments, the secondary factors may further include time sensitivity, service level agreements, customer-facing tasks, end user impact, resource utilization, optimization opportunities, inter-task dependencies, parallel tasking, regulatory compliance, alignment with key goals, operational uncertainty, auditability, authorization levels, financial reporting, or the like. In this way, the secondary factors may clarify how the task impacts the entity's operations. As a specific example, if a task is associated with the criticality and importance critical factor, the secondary factors of business criticality and impact on operations may describe how the task is critical to business continuity and the task's impact on operations.

In some embodiments, the impact analysis may weight the critical factors and the secondary factors to determine the criticality assessment. For example, as shown in FIG. 3, the impact analysis 314 may generate weights 316 used during the criticality assessment 318. Additionally, or alternatively, as shown in FIG. 4, the critical factor weights 440 and the secondary factor weights 442 may represent the weight each critical factor and secondary factor has upon a given task. In some embodiments, the criticality assessment may include the sum of the weight of the critical factor weights 440 multiplied by the sub factor weights 442. In other words, and in some embodiments, the criticality assessment may be represented by the equation as follows:

$$\text{Criticality Assessment} = \text{Sum of (Weight of Main Factors} \times \text{Weight of Secondary Factors)}$$

For example, and as shown in FIG. 4, the criticality assessment of Task 1 426 may be 0.2375. In this example, Task 1 426 includes criticality 404 and compliance 406 as critical factors 444, and operation impact 412 and regulatory compliance 414 as secondary factors 446. Next, the critical factor weights 440 are multiplied to the secondary factor weights 442, which in this case is 0.25×0.5 for the criticality 404 and operation impact 412 path, and 0.45×0.25 for the compliance 406 and regulatory compliance 414 path. Further, those values are summed to get the criticality assessment of 0.2375.

In some embodiments, the weights in each layer may equate to 1.0. For instance, as shown in FIG. 4, the critical factor weights 440 add up to equal 1.0. Further, each secondary factor weight layer also sums to equal 1.0.

In some embodiments, the weights (e.g., critical factor weights and secondary factor weights) may be adjusted to represent the entity's interests. In this way, the weights associated throughout the impact analysis may be distributed based on which critical factors and secondary factors are more closely aligned with how the entity operates. For instance, as shown in FIG. 4, the impact analysis shows that compliance 406 is most important for the critical factors, while customer trust 420 is most important for the secondary factors. In some embodiments, the weights associated with the impact analysis may be adjusted and updated as an entity evolves and its operational considerations change. For example, as shown in FIG. 3, the criticality assessment 318 may determine whether to continue processing a given task or not. In cases where a task fails to meet the criticality assessment 318, the task may be flagged 320 and the execution of the task may be terminated. In cases where a task meets the criticality assessment 318 requirements, the task continues to be processed by the system.

As shown in block 204 of FIG. 2, the process flow 200 of this embodiment includes allocating a grant token to the task, wherein the grant token comprises an allotment of processing time of the system to complete the task.

In some embodiments, allocating the grant token further includes ensuring the criticality assessment is equal to or greater than a criticality assessment threshold. For example, as shown in FIG. 3 and as discussed above, the task may pass the criticality assessment 318. The criticality assessment threshold may represent a baseline of the entity's interests in deciding whether to continue processing the task. For example, an entity may decide a task with a criticality assessment score of greater than a 0 may continue to be processed. In this example, if the criticality assessment 318 has a criticality assessment greater than 0, the task may be assigned grant tokens 322. The grant tokens 322 may represent the processing time allocated to the task at hand. Further, in some embodiments, the grant tokens 322 may be a static time measurement of seconds, minutes, hours, days, weeks, months, years, or the like. For example, the grant tokens 322 may represent an allotment of processing time equal to 1 second, 2 seconds, 3 seconds, 4 seconds, 5 seconds, 10 seconds, 15 seconds, 20 seconds, 25 seconds, 30 seconds, or 60 seconds. In another example, the grant tokens 322 may represent an allotment of processing time equal to 1 minute, 2 minutes, 3 minutes, 4 minutes, 5 minutes, 10 minutes, 15 minutes, 20 minutes, 25 minutes, 30 minutes, or 60 minutes. In another example, the grant tokens 322 may represent an allotment of processing time equal to 1 hour, 2 hours, 3 hours, 4 hours, 5 hours, 10 hours, 15 hours, 20 hours, 25 hours, 30 hours, or 60 hours.

In some embodiments, the present invention may use a smart load balancer to prioritize the execution of the task by analyzing the criticality assessment of the task. In some embodiments, the smart load balancer may prioritize tasks with higher criticality assessments over lower criticality assessments. As shown in FIG. 3, the smart load balancer 324 may balance (e.g., rebalance) an execution (e.g., processing) of a task based on its priority.

In some embodiments, the smart load balancer further includes selecting a server to handle the execution of the task. For example, as shown in FIG. 3, the smart load balancer 324 may perform the server selection 326 in order to choose the server(s) on which the task may be processed. In some embodiments, the smart load balancer further includes allocating resources for the execution of the task. For example, as shown in FIG. 3, the smart load balancer 324 may perform the resource allocation 328. In some embodiments, the resources may include computing resources, networking resources, memory resources, or the like.

As shown in block 206 of FIG. 2, the process flow 200 of this embodiment includes monitoring execution of the task, wherein monitoring the execution includes comparing an execution timeframe, wherein the execution timeframe includes an amount of processing time to execute the task, and an execution timeframe factor, wherein the execution timeframe factor is a multiple of the processing time allocated by the grant token.

As shown in FIG. 3, the task execution 330 may include the continuous monitoring 332 of the task during its execution. The execution of the task may include the processing and/or completion of the task. In some embodiments, the execution timeframe includes the processing time of the task. The processing time may be based on the execution, completion, processing, or the like of the task. In this way, the processing time indicates how much time has passed since the start of processing of the task. For example, the execution timeframe (e.g., processing time) may include a beginning portion when the task is initiated or started and an ending portion when the task is completed or executed. The execution timeframe may include several components, such as the start time, the processing time, any wait time during the task, the end time, and the duration time.

Further, the execution timeframe factor may indicate a multiple of the processing time allocated by the grant token, which may include any number. In some embodiments, the execution timeframe factor may include a multiple of 0.25, 0.5, 1.0, 1.25, 1.5, 1.75, 2.0, 2.25, 2.5, 2.75, 3.0, 3.5, 4.0, 4.5, 5.0, 10.0, or the like. For example, if the grant token indicates an allotment of processing time of 5 minutes, the execution timeframe factor may be a 2.0 multiple, or 10 minutes of processing time.

In some embodiments, monitoring the execution of the task further includes comparing the execution timeframe and the execution timeframe factor to determine a flag type. By comparing the execution timeframe and the execution timeframe factor, the system may determine the task is taking longer than expected to complete its execution.

In some embodiments, the flag type may include a green flag, wherein the green flag indicates the task is complete and the grant token is not exhausted. In this way, the task may be completed (e.g., executed) within the processing time allotted via the grant token. As shown in FIG. 3, the system may determine that the task is completed 334 and may then share the results 346 with the system, or the other components associated with the system. For example, if a task is allocated a grant token which provides 5 minutes of processing time, and the task is completed (e.g., executed) within 2 minutes, the task would be assigned a green flag.

In some embodiments, the flag type may include a yellow flag, wherein the yellow flag indicates the task is not complete, the grant token is exhausted, and the execution timeframe is less than the execution timeframe factor. In this way, the system may flag a task that has exhausted its allocated grant token but has not been completed. For example, as shown in FIG. 3, if the task is not completed (as shown in block 334), the system will check whether the grant tokens have been exhausted (block 336). If the grant tokens have not been exhausted, the system will continue executing the process of task execution 330. If the grant tokens have been exhausted, the system will check whether a red flag 338 should be implemented on the task. By doing so, the system may compare the execution timeframe with the execution timeframe factor. If the execution timeframe is less than the execution timeframe factor, the system may generate additional buffer tokens 340, as discussed below. For example, if the task has exhausted its grant token of 5 minutes but has not exceeded the execution timeframe factor of 10 minutes (a 2.0 multiple of the allocated processing time via the grant token), the system may flag the task with a yellow flag. The yellow flag may relay the task's status to an operator (e.g., technician, maintenance worker, employee, IT personnel, manager, or the like) of the system, who may take further action such as terminating the task, continued monitoring of the task, or granting the task additional grant tokens.

In some embodiments, the yellow flag may further include generating an additional grant token for the execution of the task. In this way, the system may generate an additional grant token, which may allocate an additional amount of processing time to the task. For instance, as shown in FIG. 3, the system may determine that additional buffer tokens should be generated (block 340 of FIG. 3) for the task to be completed. Once the task is allocated the additional buffer tokens, the task execution 330 may continue. During the execution of the task, the system may continuously monitor the execution of the task (as shown in block 332 of FIG. 3). For example, if the task has exhausted its grant token of 5 minutes but has not exceeded the execution timeframe factor of 10 minutes, the system may generate an additional grant token of 5 minutes of processing time for the task to complete its execution. The reasons for why a task may take longer than expected (e.g., when a task has exhausted its grant token) may vary and could include, but is not limited to, limited resources, software inefficiencies, larger input data volume than expected, higher system load, hardware issues, dependency delays, bugs or errors, unexpected complexity, or the like.

In some embodiments, the flag type may include a red flag, wherein the red flag indicates the task is not complete, the grant token is exhausted, and the execution timeframe is equal to or greater than the execution timeframe factor. In some embodiments, when the tokens become exhausted, the system may check whether the execution timeframe is equal or greater than the execution timeframe factor. As shown in FIG. 3, the system may check, after it determines that the tokens are exhausted (as shown in block 336), whether a red flag is appropriate for the task (e.g., as shown in block 338). For example, if a task is allocated a grant token which assigns 5 minutes of processing time, and the execution timeframe factor is a multiple of 2.0 of the grant token (or 10 minutes of processing time), and the task's execution has taken longer than 10 minutes, the task may be flagged with a red flag.

In some embodiments, the system may determine additional execution timeframe factors to further delineate additional flag types. In this way, the system may define execution timeframe factors for each flag type. For example, the green flag may indicate that the execution time is less than or equal to the processing time allocated by the grant token. Similarly, the yellow flag may indicate the execution time is greater than 100% and less than 150% of the processing time allocated by the grant token. Further, the red flag may indicate the execution time is greater than 150% and less than 200% of the processing time allocated by the grant token. Further still, the system may automatically block a process if the execution time is greater than 200% of the processing time allocated by the grant token. In some embodiments, the delineations between the flag types may be adjusted by the system, an operator of the system, a manager of the system, or the like. In this way, the system may dynamically modify its operations based on the type of tasks received from clients (e.g., due to seasonality, developing a new client base, updating computing equipment, or the like). Further, in some embodiments, while a process may be flagged by the system, an operator of the system (e.g., technician, maintenance personnel, manager, etc.) may still have the ability to override and either continue executing the task or terminate the task.

As shown in block 208 of FIG. 2, the process flow 200 of this embodiment includes terminating a malicious task, wherein terminating the malicious task includes flagging the malicious task and terminating completion of the malicious task. In some embodiments, after the system determines the red flag is appropriate for a task, the system may terminate the task and flag the task as malicious. In some embodiments, and as shown in FIG. 3, the system may terminate the task as shown in block 342. In some embodiments, and as shown in FIG. 3, flagging the task as malicious may include flagging the task for cryptojacking as shown in block 344.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for determining electronic activity using advanced computational models for data analysis and automated processing, the system comprising:

a processing device;

a non-transitory storage device containing instructions when executed by the processing device, causes the processing device to perform the steps of:

generate a criticality assessment of a task based on one or more weights determined by an impact analysis, wherein the impact analysis determines how the task affects an entity's operations;

allocate a grant token to the task, wherein the grant token comprises an allotment of processing time of the system to complete the task;

monitor execution of the task, wherein monitoring the execution comprises comparing an execution timeframe, wherein the execution timeframe comprises an amount of processing time to execute the task, and an execution timeframe factor, wherein the execution timeframe factor is a multiple of the processing time allocated by the grant token; and terminate a malicious task, wherein terminating the malicious task comprises flagging the malicious task and terminating completion of the malicious task;

wherein determining how the task affects an entity's operations comprises: pooling the task in a task pool, wherein the task is received from a client device; bucketing the task based on a critical factor, wherein the critical factor comprises an integral operation associated with the entity; and segmenting the task based on a secondary factor, wherein the secondary factor comprises a supplementary description of the integral operation associated with the entity;

wherein allocating the grant token further comprises ensuring the criticality assessment is equal to or greater than a criticality assessment threshold.

2. The system of claim 1, wherein executing the instructions further causes the processing device to use a smart load balancer to prioritize the execution of the task by analyzing the criticality assessment of the task.

3. The system of claim 2, wherein the smart load balancer further comprises: selecting a server to handle the execution of the task; and allocating resources for the execution of the task.

4. The system of claim 1, wherein monitoring the execution of the task further comprises comparing the execution timeframe and the execution timeframe factor to determine a flag type, wherein the flag type comprises: a green flag, wherein the green flag indicates the task is complete and the grant token is not exhausted; a yellow flag, wherein the yellow flag indicates the task is not complete, the grant token is exhausted, and the execution timeframe is less than the execution timeframe factor, and a red flag, wherein the red flag indicates the task is not complete, the grant token is exhausted, and the execution timeframe is equal to or greater than the execution timeframe factor.

5. The system of claim 4, wherein the yellow flag further comprises generating an additional grant token for the execution of the task.

6. A computer program product for determining electronic activity using advanced computational models for data analysis and automated processing, the computer program product comprising a non-transitory computer-readable medium comprising code causing an apparatus to:

generate a criticality assessment of a task based on one or more weights determined by an impact analysis, wherein the impact analysis determines how the task affects an entity's operations;

allocate a grant token to the task, wherein the grant token comprises an allotment of processing time of the system to complete the task;

monitor execution of the task, wherein monitoring the execution comprises comparing an execution timeframe, wherein the execution timeframe comprises an amount of processing time to execute the task, and an execution timeframe factor, wherein the execution timeframe factor is a multiple of the processing time allocated by the grant token; and terminate a malicious task, wherein terminating the malicious task comprises flagging the malicious task and terminating completion of the malicious task;

wherein determining how the task affects an entity's operations comprises: pooling the task in a task pool, wherein the task is received from a client device; bucketing the task based on a critical factor, wherein the critical factor comprises an integral operation associated with the entity; and segmenting the task based on a secondary factor, wherein the secondary factor comprises a supplementary description of the integral operation associated with the entity;

wherein allocating the grant token further comprises ensuring the criticality assessment is equal to or greater than a criticality assessment threshold.

7. The computer program product of claim 6, wherein the code further causes the apparatus to use a smart load balancer to prioritize the execution of the task by analyzing the criticality assessment of the task.

8. The computer program product of claim 7, wherein the smart load balancer further comprises: selecting a server to handle the execution of the task; and allocating resources for the execution of the task.

9. The computer program product of claim 6, wherein monitoring the execution of the task further comprises comparing the execution timeframe and the execution timeframe factor to determine a flag type, wherein the flag type comprises: a green flag, wherein the green flag indicates the task is complete and the grant token is not exhausted; a yellow flag, wherein the yellow flag indicates the task is not complete, the grant token is exhausted, and the execution timeframe is less than the execution timeframe factor; and a red flag, wherein the red flag indicates the task is not complete, the grant token is exhausted, and the execution timeframe is equal to or greater than the execution timeframe factor.

10. The computer program product of claim 9, wherein the yellow flag further comprises generating an additional grant token for the execution of the task.

11. A method for determining electronic activity using advanced computational models for data analysis and automated processing, the method comprising:

generating a criticality assessment of a task based on one or more weights determined by an impact analysis, wherein the impact analysis determines how the task affects an entity's operations;

allocate a grant token to the task, wherein the grant token comprises an allotment of processing time of the system to complete the task;

monitor execution of the task, wherein monitoring the execution comprises comparing an execution timeframe, wherein the execution timeframe comprises an amount of processing time to execute the task, and an execution timeframe factor, wherein the execution timeframe factor is a multiple of the processing time allocated by the grant token; and terminate a malicious task, wherein terminating the malicious task comprises flagging the malicious task and terminating completion of the malicious task;

wherein determining how the task affects an entity's operations comprises: pooling the task in a task pool, wherein the task is received from a client device; bucketing the task based on a critical factor, wherein the critical factor comprises an integral operation associated with the entity; and segmenting the task based on a secondary factor, wherein the secondary factor comprises a supplementary description of the integral operation associated with the entity;

wherein allocating the grant token further comprises ensuring the criticality assessment is equal to or greater than a criticality assessment threshold.

12. The method of claim 11, wherein the method further comprises using a smart load balancer to prioritize the execution of the task by analyzing the criticality assessment of the task.

13. The method of claim 12, wherein the smart load balancer further comprises: selecting a server to handle the execution of the task; and allocating resources for the execution of the task.

14. The method of claim 11, wherein monitoring the execution of the task further comprises comparing the execution timeframe and the execution timeframe factor to determine a flag type, wherein the flag type comprises: a green flag, wherein the green flag indicates the task is complete and the grant token is not exhausted; a yellow flag, wherein the yellow flag indicates the task is not complete, the grant token is exhausted, and the execution timeframe is less than the execution timeframe factor; and a red flag, wherein the red flag indicates the task is not complete, the grant token is exhausted, and the execution timeframe is equal to or greater than the execution timeframe factor.

* * * * *